Jan. 20, 1959 R. G. WERDEN 2,869,335
AIR CONDITIONING AND HEATING SYSTEMS
Filed June 27, 1955
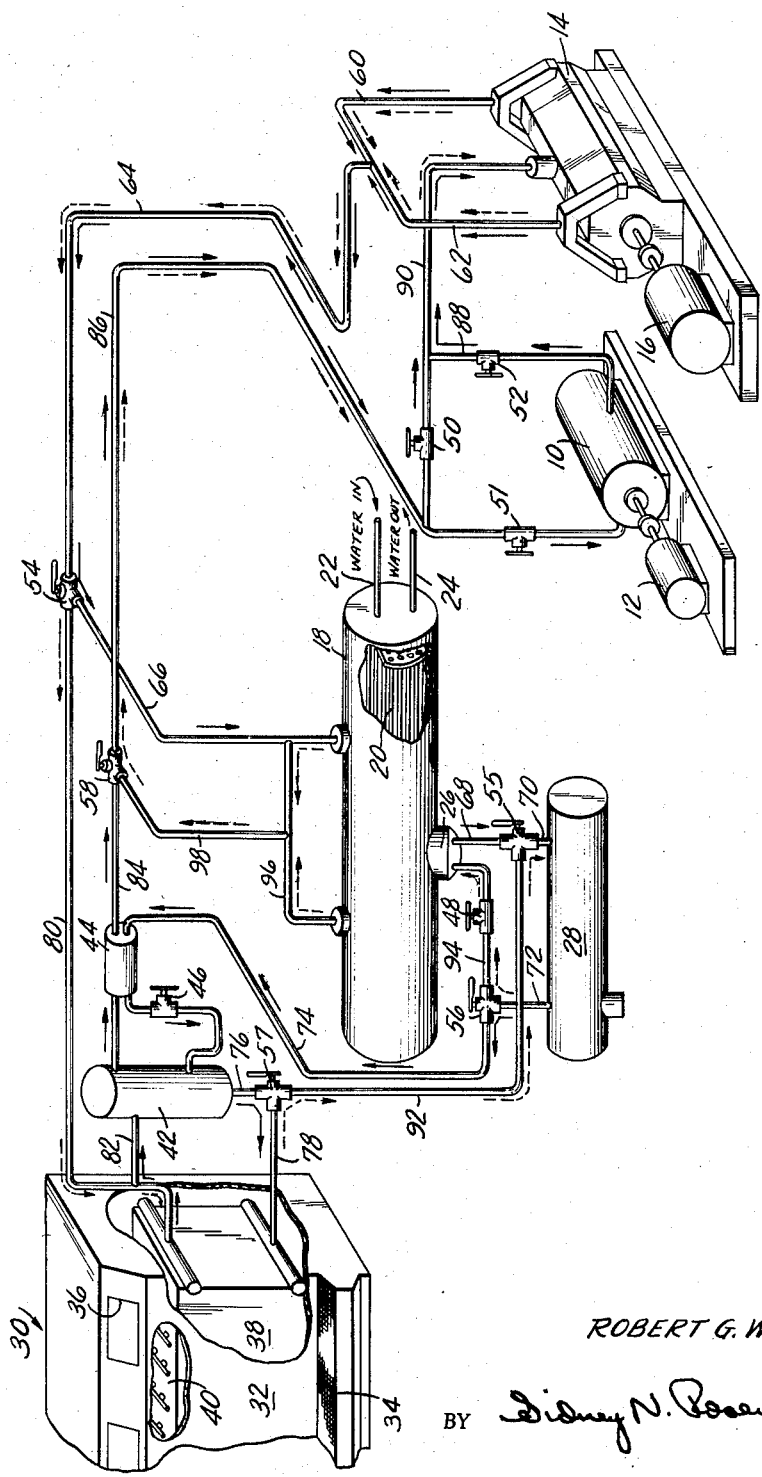
INVENTOR
*ROBERT G. WERDEN*
BY *Sidney N. Rosenfeld*
ATTORNEY

United States Patent Office 2,869,335
Patented Jan. 20, 1959

2,869,335

AIR CONDITIONING AND HEATING SYSTEMS

Robert G. Werden, Jenkintown, Pa., assignor, by mesne assignments, to Borg-Warner Corporation, Chicago, Ill., a corporation of Illinois Application June 27, 1955, Serial No. 517,971

5 Claims. (Cl. 62—324)

This invention relates to a reversible refrigerating system for combined heating and cooling of buildings for human comfort.

In a conventional refrigerating system, heat which is to be removed from an enclosure is taken into the system at a lower level in a low temperature evaporator and discharged at a higher level in a condenser so that available condensing medium such as water or air at normal temperatures may absorb the heat rejected.

It has long been known that a refrigerating system may be reversed and can be utilized for heating an enclosure by using the heat dissipated in the condenser. When used in this manner, the effect of refrigeration obtained by the removal of heat from a low temperature medium is wasted. A refrigerating system operated in this fashion is known as a heat pump or reverse cycle system.

The desirability of using a conventional refrigerating system for both cooling and heating is well recognized, but such use has been beset by many difficulties. When using outside air as a heat source, as the temperature of the air drops the capacity of the system likewise drops, at the very time when heating requirements are greatest. It is possible for a single stage compressor to maintain the required temperature differential between the evaporator and condenser so that heat may be picked up at moderate outside temperatures and discharged at a high enough temperature to do useful heating in moderate climates; in colder climates, however, this has proven to be impossible of attainment if the compressor is to operate efficiently. Efficient compression ratios in a single stage compressor do not produce adequate temperature differentials to supply the heat necessary when outside temperatures are low. It is a well-established fact that the efficiency of a compressor varies inversely as the compression ratio at which it operates.

It has been proposed that well water be used as a heat source for winter operation. While this has proven satisfactory, it is necessarily limited to those locales that have sufficient water practicably available for the purpose. Other proposals have involved using the ground as a heat source but this has not proven completely satisfactory during prolonged cold spells when the heat available generally has proven insufficient.

For these and other reasons, it has been generally accepted that simple heat pump operation, while satisfactory in moderate climates, is not satisfactory in colder climates that have sustained cold periods below approximately 30° F.

By utilizing a compound compression system for heat pump operation, applicant has found that he can operate a heat pump satisfactorily in climates where the temperature drops to 0° F. and lower, thus extending the range of heat pump applications to greater areas. By using such a compound compression system applicant can maintain the evaporator temperature at a low enough level to extract heat from 0° F. air, or lower, and still efficiently pump this heat up to a high enough pressure and temperature to supply sufficient heat for the enclosure to be heated.

Another important advantage of this invention is that it may be designed to operate as an efficient single stage system for the load encountered during the cooling season and still be balanced to operate efficiently as a heating system to carry the heating load during the heating season in the same conditioned space in any locality where the outside temperatures vary greatly between winter and summer conditions. Applicant provides a single stage compression system for air conditioning duty, and a second compressor balanced out to give the desired evaporator temperature to pick up heat from the low temperature air for heating duty. The second compressor delivers refrigerant to the high stage compressor, which operates single stage on cooling duty, at a pressure such that its compression ratio and efficiency varies but slightly from that on cooling duty. It will be appreciated that, generally, the discharge pressure of the high stage compressor will be slightly higher on heating duty because of the necessarily elevated temperature of the condensing medium which is utilized for heating purposes. Since the efficiency of the high stage or cooling system compressor is maintained at substantially the same point in both heating and cooling duty of the instant system it will be readily apparent that considerably less total brake horsepower per ton of refrigeration is required as against a single stage compression heat pump system since the latter necessarily operates in a much less efficient range as pointed out above.

It is among the objects of this invention to provide a method of picking up heat from low temperature air by way of a refrigerating system and efficiently pumping this heat in stages up to a sufficiently high level to do useful heating.

It is another object of this invention to provide a multi-stage compression refrigeration system for winter heating duty operable as a single stage system for summer air conditioning.

It is a further object to provide a year around system for heating and cooling by providing a single stage compression refrigeration system for summer comfort air conditioning and a multi-stage system for economical and efficient heating at low temperatures.

The general nature of the invention having been set forth, a preferred embodiment will now be described with reference to the drawings, to disclose fully the features already mentioned as well as features of advantage which can be better appreciated after a detailed description.

The drawing represents a schematic isometric view of a year around air conditioning system embodying the present invention. In the interest of simplifying the drawing, oil traps, receivers, automatic valves and intercoolers, etc., have been eliminated.

As shown in the drawing, a rotary compressor 10 driven by a motor 12 delivers a circulating refrigerant to a reciprocating compressor 14 driven by a motor 16. It will, of course, be appreciated that any combination of well-known compressors may be utilized to practice the invention, or even an internally compounded compressor wherein at least one stage may be by-passed for summer cooling duty.

An indoor heat exchanger 18 is provided which functions as a heater for winter operation and a cooler for summer operation. Heat exchanger 18 comprises an outer shell having a tube bundle therein for receiving a circulating conditioning medium such as water through inlet line 22. The water is discharged through outlet line 24 after having circulated through the tube bundle in heat exchanging relation with the refrigerant contained within the outer shell and surrounding the tube bundle.

A sump 26 integral with heat exchanger 18 receives liquid refrigerant when heat exchanger 18 is operating as a heater. It will be apparent that air could be used as the conditioning medium with an appropriate heater-cooler for effecting a transferral of heat between the refrigerant and the air.

A high pressure receiver 28 receives liquid refrigerant from sump 26 or from an outdoor heat exchanger 30 when heat exchanger 18 is operating as a cooler.

The outdoor heat exchanger is of the type wherein outside air, or air exhausted from the enclosure, serves as the evaporative or condensing medium and in this embodiment comprises a casing 32 having an air inlet 34 and an air outlet 36. A fan (not shown) may be provided for aiding in the circulation of air. Heat exchanger 30 functions as a condenser for summer operation and an evaporator for winter operation. A coil bank 38 receives the circulating refrigerant for heat transfer with the circulated air. For summer operation, a pump (not shown) may be used to pick up water contained in a sump formed in the bottom of casing 32 and circulates it through spray header 40 and over the coil bank in counterflow relation to the circulated air for use in conjunction with the circulated air as a condensing medium.

A low pressure surge drum 42 serves to collect a body of liquid refrigerant when heat exchanger 30 is used as an evaporator to thereby maintain coil bank 38 in a flooded condition and also to receive any unevaporated refrigerant from the coil bank. A superheater 44 allows hot refrigerant liquid on its way to the surge drum to exchange heat with the cold gas leaving the coil bank in order to enhance the refrigerating effect of the liquid, and to evaporate any liquid still contained in the gas.

Suitable refrigerant expansion valves 46 and 48 serve to expand the high pressure refrigerant liquid into either heat exchanger 30 or heat exchanger 18.

Two-way valves 50–52 inclusive are provided to control refrigerant flow to compressor 10.

Appropriate three-way valves 54–58 inclusive serve to reverse the refrigerant flow between the heat exchangers depending on whether the system is heating or cooling.

*Winter operation*

The solid arrows serve to depict the flow path of the refrigerant for winter operation.

High pressure refrigerant gas is discharged from compressor 14 via outlet lines 60 and 62 and then merges into line 64 whence it flows to heat exchanger 18 via valve 54 and line 66. The gas is then condensed to a liquid at the same pressure by the water circulating in tube bundle 20, said water then being utilized for heating purposes. The high pressure refrigerant liquid is collected in sump 26 and then flows via line 68, valve 55 and line 70 into the high pressure receiver. The refrigerant liquid than flows through line 72 and is then directed by valve 56 to line 74 and through the superheater and via expansion valve 46 into the low pressure surge drum. Expansion valve 46 thus marks the division between the high pressure and low pressure sides of the system.

From the low pressure surge drum, the liquid then flows via line 76, valve 57 and line 78 into and through coil bank 38 where it is evaporated by the removal of heat from the air flowing across the coil bank. A mixture of liquid and gas exits from the coil bank and then is directed via a portion of line 80 into line 82 and into the low pressure surge drum. The liquid drops out of the mixture at this point, while the gas flows in line 84 through the superheater and thence by way of valve 58 into line 86 past valve 51 and to the suction of compressor 10. The low pressure gas is then compressed and goes via line 88 and a portion of line 90 into the suction of compressor 14 where the pressure is further raised for discharge into heater 18.

It is to be understood that for winter operation, expansion valve 48 remains closed. Valves 51 and 52 are open and valve 50 closed to allow flow through compressor 10. Three-way valves 54–58 inclusive are set to give the desired flow path.

During those times of the year that the outside temperature does not drop below approximately 30° F., compressor 10 may be by-passed and the system operated as a single stage heat pump.

*Summer operation*

The flow path of the refrigerant during summer operation is shown by the broken arrows.

Expansion valve 46 is closed and expansion valve 48 is opened. Valve 50 is opened and valve 51 and 52 are closed so that the refrigerant will by-pass compressor 10. Three-way valves 54–58 are appropriately set.

High pressure refrigerant gas discharged from compressor 14 flows through line 64 and is directed by valve 54 into line 80 and into coil bank 38 of heat exchanger 30 which is now functioning as a condenser. The liquid refrigerant on leaving the coil bank flows via valve 57 into line 92 and thence via valve 55 into the high pressure receiver 28. Valve 56 then directs the liquid refrigerant to expansion valve 48 via line 94, said valve 48 functioning as the point of division between the high and low pressure sides of the system on cooling duty.

After being expanded, the low pressure liquid flows through heat exchanger 18 in heat exchanging relation with the water flowing through the tube bundle. The refrigerant is evaporated by taking heat from the water and the chilled water is then used for cooling purposes. Refrigerant gas leaves heat exchanger 18 via line 96 and a portion of line 66 merging into line 98. Valve 58 communicates lines 98 and 86 and the gas then flows via line 90 past valve 50 to the suction of compressor 14.

It is contemplated that in a commercial adaptation of the above invention, an interstage cooler will be utilized when the system is operating compounded on the heating cycle. Such an intercooler conventionally serves two purposes. It reduces the temperature of the gas flowing from the low stage to the high stage compressor so that the latter will operate within a permissive temperature range. Secondly, it subcools the refrigerant liquid from the heater enroute to the evaporator to increase the total heat absorbing capacity of the refrigerant. Since such interstage coolers are well-known in the art and the same has not been claimed, it has not been illustrated. It is believed that the desirability of using an interstage cooler will be obvious to one skilled in the art.

As many possible embodiments may be made of the mechanical features of the above invention and as the art herein described might be varied in various parts, all without departing from the scope of the invention, it is to be understood that all matter hereinabove set forth or shown in the accompanying drawing is to be interpreted as illustrative and not in a limiting sense.

I claim as my invention:

1. A reversible refrigerating system utilizing a volatile refrigerant for heating or cooling a conditioning medium comprising a first heat-exchanger and means for supplying outside air thereto; a second heat-exchanger and means for supplying the conditioning medium thereto; compression means for said volatile refrigerant; means connecting said heat-exchangers and compression means in a closed refrigerant circuit; means for serially directing the refrigerant from said compression means through said heat-exchangers, first through said first heat-exchanger when cooling said conditioning medium or first through said second heat-exchanger when heating said conditioning medium; means for expanding the refrigerant in the second heat-exchanger of the series; and means for operating said compression means on single stage compression when said conditioning medium is being cooled and on compound compression in heating said conditioning medium.

2. An air source refrigerating system of the reversible type utilizing a volatile refrigerant for heating or cooling a conditioning medium comprising, means for evaporating said refrigerant; means for condensing said refrigerant; means for passing said conditioning medium into heat-exchanging relationship with evaporating refrigerant when cooling of said conditioning medium is desired; means for passing said conditioning medium into heat-exchanging relationship with condensing refrigerant when heating of said conditioning medium is desired; single stage compression means for maintaining evaporating and condensing pressures when said system is cooling said conditioning medium; and compound compression means for maintaining evaporating and condensing pressures in the period said system is heating said conditioning medium.

3. The system of claim 2 wherein said compound compression means comprises two compressors connected in series flow arrangement and said single stage compression means comprises one of said compressors.

4. A reversible refrigerating system of the compressor, condenser, evaporator type utilizing a volatile refrigerant for heating or cooling a conditioning medium to be supplied to an enclosure comprising, an outdoor heat-exchanger and means for supplying outside air thereto; an indoor heat-exchanger and means for supplying the conditioning medium thereto; means for compressing said volatile refrigerant; means connecting said heat-exchangers and compressing means in a closed refrigerant circuit; means for directing the refrigerant from said compressing means serially through said outdoor and indoor heat-exchangers when cooling of said conditioning medium is desired, whereby said outdoor heat-exchanger functions as a refrigerant condenser and said indoor heat-exchanger functions as a refrigerant evaporator; means for reversing the flow through said heat-exchangers when heating of said conditioning medium is desired whereby the functions of said heat-exchangers are reversed; means for expanding the refrigerant in that heat-exchanger functioning as the refrigerant evaporator; and means for operating said compressing means on single stage compression when said conditioning medium is cooled and on compound compression in heating said conditioning medium.

5. The system of claim 4 wherein said compressing means comprises two compressors, and wherein said means for operating said compressing means on single stage compression or on compound compression comprises respectively, means for directing refrigerant in a path by-passing one of said compressors or in a path serially through both compressors.

References Cited in the file of this patent

UNITED STATES PATENTS

| | | |
|---|---|---|
| 2,318,318 | Lodwig | May 4, 1943 |
| 2,434,221 | Newton | Jan. 6, 1948 |
| 2,474,304 | Clancy | June 28, 1949 |
| 2,556,104 | Ransdell | June 5, 1951 |
| 2,619,326 | McLenegen | Nov. 25, 1952 |

FOREIGN PATENTS

| | | |
|---|---|---|
| 132,117 | Switzerland | Mar. 31, 1929 |